(12) United States Patent
Inagaki et al.

(10) Patent No.: US 9,698,422 B2
(45) Date of Patent: Jul. 4, 2017

(54) ACTIVE MATERIAL

(71) Applicant: KABUSHIKI KAISHA TOSHIBA, Minato-ku (JP)

(72) Inventors: Hiroki Inagaki, Yokohama (JP); Wen Zhang, Sagamihara (JP); Yasuhiro Harada, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/348,011

(22) Filed: Nov. 10, 2016

(65) Prior Publication Data
US 2017/0062820 A1 Mar. 2, 2017

Related U.S. Application Data

(62) Division of application No. 14/063,436, filed on Oct. 25, 2013.

(30) Foreign Application Priority Data

Oct. 30, 2012 (JP) .................................. 2012-239487

(51) Int. Cl.
*H01M 4/131* (2010.01)
*H01M 4/525* (2010.01)
(Continued)

(52) U.S. Cl.
CPC .......... *H01M 4/525* (2013.01); *C01G 23/005* (2013.01); *C01G 33/006* (2013.01); *C01G 49/0018* (2013.01); *H01M 4/505* (2013.01); *H01M 10/425* (2013.01); *H01M 10/48* (2013.01); *H01M 10/486* (2013.01); *C01P 2006/40* (2013.01)

(58) Field of Classification Search
CPC .. H01M 4/131; H01M 10/425; H01M 10/486; H01M 10/48; H01M 4/505
See application file for complete search history.

(56) References Cited

U.S. PATENT DOCUMENTS 7,560,900 B2 * 7/2009 Cherng ............... H01M 10/052
320/134

FOREIGN PATENT DOCUMENTS

CN 101154729 A 4/2008
CN 102272988 A 12/2011
(Continued)

OTHER PUBLICATIONS

Kim et al., Synthesis and characterization of MnV2O6 as a high capacity anode material for a lithium secondary battery, 2001, Solid State Ionics 139(2001) 57-65.*

(Continued)

*Primary Examiner* — Helen O Conley
(74) *Attorney, Agent, or Firm* — Oblon, McClelland, Maier & Neustadt, L.L.P.

(57) ABSTRACT

According to one embodiment, an active material is provided. The active material includes orthorhombic system oxide represented by the following formula: $Li_xM1M2_2O_6$. In this formula, $0 \leq x \leq 5$, M1 is at least one selected from the group consisting of Fe and Mn, and M2 is at least one selected from the group consisting of Nb, Ta and V.

11 Claims, 5 Drawing Sheets

(51) Int. Cl.
  *H01M 10/42* (2006.01)
  *H01M 10/48* (2006.01)
  *H01M 4/505* (2010.01)
  *C01G 33/00* (2006.01)
  *C01G 49/00* (2006.01)
  *C01G 23/00* (2006.01)

(56) References Cited

FOREIGN PATENT DOCUMENTS

| JP | 06-223830 A | 8/1994 |
|---|---|---|
| JP | 6-349491 A | 12/1994 |
| JP | 2000-124082 A | 4/2000 |
| JP | 2002-352801 A | 12/2002 |
| JP | 2003-200051 A | 7/2003 |
| JP | 2005-166459 A | 6/2005 |
| JP | 2009-21102 | 1/2009 |
| JP | 2010-80188 | 4/2010 |
| RU | 2 039 976 C1 | 7/1995 |

OTHER PUBLICATIONS

Combined Office Action and Search Report issued Jul. 1, 2015 in Chinese Patent Application No. 201310524867.2 (with English language translation).

M. S. Augsburger, et al., "Infrared Spectroscopy and X-Ray Diffractometry Assessment of Order-Disorder in Oxide Minerals (Mn/Fe)(Nb/Ta)$_2$O$_6$" Journal of the Mexican Chemical Society, vol. 44, No. 2, Jun. 30, 2000, pp. 151-154.

Japanese Office Action issued Jul. 5, 2016 in Patent Application No. 2013-224708 (with English translation).

Chinese Office Action dated Feb. 22, 2016, in corresponding Chinese Patent Application No. 201310524867.2 (with English-language Translation).

Office Action issued Jul. 8, 2016, in Chinese Patent Application No. 2013105248672 (with English-language Translation).

Office Action issued Jan. 10, 2017 in Japanese Patent Application No. 2013-224708.

* cited by examiner

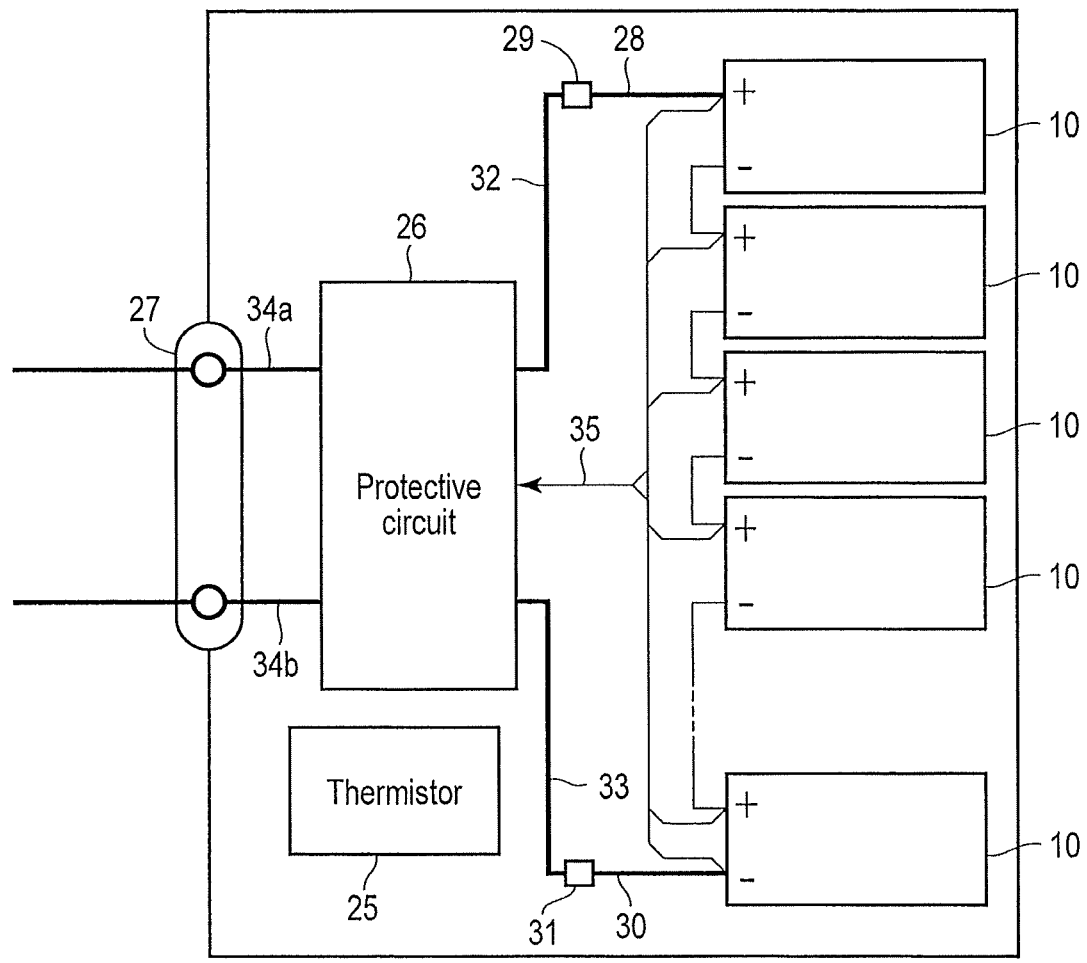
F I G. 6

ACTIVE MATERIAL

CROSS-REFERENCE TO RELATED APPLICATIONS

This application is a division of U.S. application Ser. No. 14/063,436, filed Oct. 25, 2013, now pending, and is based upon and claims the benefit of priority from the prior Japanese Patent Application No. 2012-239487, filed Oct. 30, 2012, the entire contents of which are incorporated herein by reference.

FIELD

Embodiments described herein relate generally to an active material, a nonaqueous electrolyte battery and a battery pack.

BACKGROUND

Recently, a nonaqueous electrolyte battery such as a lithium ion battery has been actively researched and developed as a high energy density battery. The nonaqueous electrolyte battery is expected to be used as a power source for hybrid electric vehicles, electric vehicles or uninterruptible power supplies for base stations for mobile phone. For this, the nonaqueous electrolyte battery is desired to have other performances such as rapid charge/discharge performance and long-term reliability, in addition to high energy density. For example, a nonaqueous electrolyte battery enabling rapid charge/discharge not only remarkably shortens the charging time but also makes it possible to improve performances of the motive force of a hybrid vehicle and to efficiently use the regenerative energy of them as power.

In order to enable rapid charge/discharge, it is necessary that electrons and lithium ions can migrate rapidly between the positive electrode and the negative electrode. When a nonaqueous electrolyte battery using a carbon-based negative electrode repeats rapid charge/discharge, dendrite precipitation of metal lithium is occurred on the electrode, raising the fear as to heat generation and fires caused by internal short circuits.

In light of this, a nonaqueous electrolyte battery using a metal composite oxide for a negative electrode in place of a carbonaceous material has been developed. Particularly, in a nonaqueous electrolyte battery using titanium oxide for the negative electrode, rapid charge/discharge can be performed stably. Such a battery also has a longer life than those using a carbonaceous material.

However, titanium oxide has a higher (i.e., nobler) potential than the carbonaceous material relative to metal lithium. Further, titanium oxide has a lower capacity per weight. Thus, a nonaqueous electrolyte battery using titanium oxide for the negative electrode has a problem such that the energy density is low.

BRIEF DESCRIPTION OF THE DRAWINGS

FIG. 6 is a block diagram showing the electric circuit of the battery pack shown in FIG. 5.

DETAILED DESCRIPTION

Figure 1:
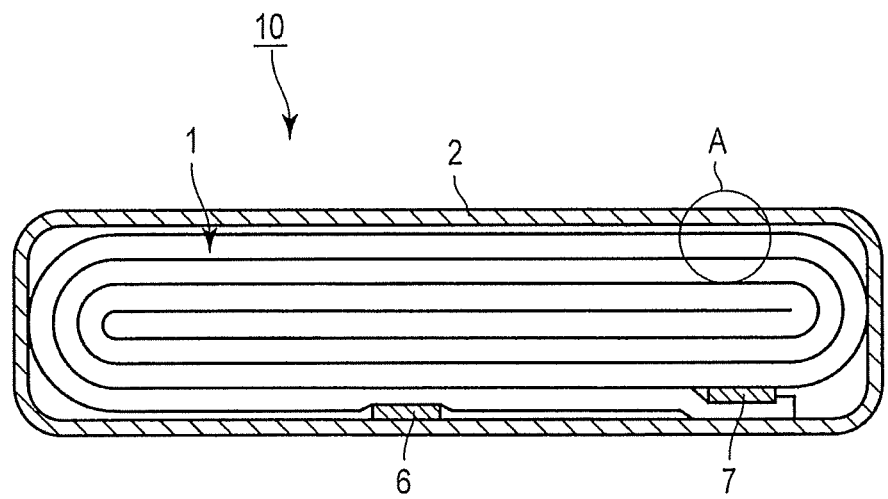
FIG. 1 is a cross-sectional view of a flat-shaped nonaqueous electrolyte battery according to a second embodiment.

In general, according to one embodiment, an active material for a battery is provided. The active material comprises orthorhombic system oxide represented by the following formula: $Li_xM1M2_2O_6$. In this formula, $0 \leq x \leq 5$, M1 is at least one selected from the group consisting of Fe and Mn, and M2 is at least one selected from the group consisting of Nb, Ta and V.

The embodiments will be explained below with reference to the drawings. In this case, the structures common to all embodiments are represented by the same symbols and duplicated explanations will be omitted. Also, each drawing is a typical view for explaining the embodiments and for promoting the understanding of the embodiments. Though there are parts different from an actual device in shape, dimension and ratio, these structural designs may be properly changed taking the following explanations and known technologies into consideration.

First Embodiment

According to the first embodiment, there is provided an active material which comprises an orthorhombic system oxide represented by the formula: $Li_xM1M2_2O_6$. In this formula, $0 \leq x \leq 5$, M1 is at least one selected from the group consisting of Fe and Mn, and M2 is at least one selected from the group consisting of Nb, Ta and V.

The content of lithium ions in the orthorhombic system oxide represented by the formula: $Li_xM1M2_2O_6$ ($0 \leq x \leq 5$) may vary depending on the charge and discharge state and the maximum content of Li ions per 1 mole of the oxide may be 5 mol. The electrode containing the active material containing the oxide can increase the absorption/release amount of lithium ions per mass. Accordingly, the nonaqueous electrolyte battery comprising the electrode containing the active material containing the oxide can realize high energy density.

The orthorhombic system oxide represented by the formula $Li_xM1M2_2O_6$ ($0 \leq x \leq 5$) has a gradual change in electrical potential (from 0.5 V (vs. Li/Li$^+$) to 2.5 V (vs. Li/Li$^+$)) due to the absorption and release reaction of lithium. Thus, the nonaqueous electrolyte battery comprising the electrode containing the active material containing the orthorhombic system oxide can absorb and release lithium at a potential nobler than the potential during electrocrystallization of metal lithium. The nonaqueous electrolyte battery can reduce or eliminate the electrocrystallization of metal lithium, resulting in rapid charge and discharge.

The orthorhombic oxide contained in the active material according to the embodiment is more preferably represented by $Li_xFeNb_2O_6$ or $Li_xFeV_2O_6$ ($0 \leq x \leq 5$). Since the orthorhombic system oxide resented by $Li_xFeNb_2O_6$ or $Li_xFeV_2O_6$ ($0 \leq x \leq 5$) has a crystal lattice advantageous to the conduction of lithium ions, it is possible to achieve an improvement in rapid charge/discharge performance of the nonaqueous electrolyte battery and an improvement in electrode capacitance.

The orthorhombic system oxide represented by the formula: $Li_xM1M2_2O_6$ ($0 \leq x \leq 5$) may be represented by the formula: $Li_xM1M2_2O_{6-\delta}$ ($0 \leq x \leq 5$, $0 \leq \delta \leq 0.3$).

During the preparation of the orthorhombic system oxide, oxygen deficiency may occur in a raw material or an intermediate product. Further, inevitable impurities contained in the raw material and impurities which have been mixed in during the preparation may be present in the prepared orthorhombic system oxide. Therefore, the active material according to the embodiment may contain an orthorhombic system oxide having the composition deviated from the stoichiometric ratio represented by the formula $Li_xM1M2_2O_6$ ($0 \leq x \leq 5$) because of, for example, the above inevitable factor. For example, the oxygen deficiency generated during the preparation of the orthorhombic system oxide may cause an orthorhombic system oxide having the composition represented by the formula: $Li_xM1M2_2O_{6-\delta}$ ($0 \leq x \leq 5$, $0 < \delta \leq 0.3$) to be prepared.

However, even in the case of the orthorhombic system oxide having the composition deviated from the stoichiometric ratio because of the above inevitable factor, the absorption/release amount of lithium ions per mass is high, and the absorption and release reaction of lithium is generated within a range of 0.5 V (vs. Li/Li$^+$) to 2.5 V (vs. Li/Li$^+$)). Accordingly, an active material which contains the orthorhombic system oxide having the composition deviated from the stoichiometric ratio because of the above inevitable factor exerts the same effect as an active material which contains an orthorhombic system oxide having the composition represented by the formula $Li_xM1M2_2O_6$ ($0 \leq x \leq 5$).

For the above reason, the active material according to the embodiment encompasses the active material which contains the orthorhombic system oxide having the composition deviated from the stoichiometric ratio represented by the formula $Li_xM1M2_2O_6$ ($0 \leq x \leq 5$) because of the above inevitable factor.

<Particle Diameter and BET Specific Surface Area>

The average particle diameter of the orthorhombic system oxide contained in the active material according to this embodiment is not particularly limited and it may be changed according to desired battery characteristics.

The BET specific surface area of the orthorhombic system oxide contained in the active material according to this embodiment is not particularly limited and it is preferably 1 m$^2$/g or more and less than 50 m$^2$/g.

The term "BET specific surface area" means a specific surface area determined by the BET method. The specific surface area of the particles is generally measured using a method in which molecules whose adsorption occupied area is known are allowed to adsorb to the plane of powder particles at the temperature of liquid nitrogen to find the specific surface area of the sample from the amount of the adsorbed molecules. Among them, the most frequently used method is a BET method based on the low temperature/low humidity physical adsorption of an inert gas. This method is a method in which the Langmuir theory as a monolayer adsorption theory is extended to multilayer adsorption and is the best-known method as a calculation method of the specific surface area of a solid such as a powder or particles.

In the case of a battery comprising a negative electrode containing an active material containing an orthorhombic system oxide having a specific surface area of 1 m$^2$/g or more, the contact area between the negative electrode active material and the electrolyte solution can be sufficiently ensured, and excellent discharge rate characteristics are easily obtained. Further, the charging time can be reduced.

On the other hand, in the case of a negative electrode containing an active material containing an orthorhombic system oxide having a specific surface area of less than 50 m$^2$/g, it is possible to prevent the reactivity with the electrolyte solution from being too high. Thus, lifetime characteristics of a nonaqueous electrolyte battery comprising the above negative electrode can be improved. Further, the active material containing an orthorhombic system oxide having a specific surface area of less than 50 m$^2$/g can improve coating properties of a slurry containing an active material to be used in the following production of an electrode.

<Production Method>

The active material according to this embodiment can be produced by, for example, the following method.

First, an oxide or a salt containing at least one selected from the group consisting of Fe and Mn, i.e., M1 and an oxide or a salt containing at least one selected from the group consisting of Nb, Ta, and V, i.e., M2 are mixed at a molar ratio so as to obtain an orthorhombic system oxide represented by $M1M2_2O_6$. The above salt is preferably a salt such as a carbonate and nitrate, which is decomposed at a relatively low temperature to form an oxide.

Next, the obtained mixture is ground and blended as uniformly as possible and is then sintered.

The sintering is performed at a temperature range from 800 to 1500° C. for a total of 1 to 100 hours.

When the sintering temperature is raised to a temperature range from 900 to 1300° C., an active material with low impurity phase content can be obtained.

As the particle diameter of the raw powder is smaller, an active material having a uniform phase is obtained within a shorter time for sintering. The active material prepared by sintering for a short time has a small particle diameter and is excellent in crystallinity. The nonaqueous electrolyte battery comprising the negative electrode containing the active material is excellent in output characteristics.

Lithium ions can be inserted by charging the orthorhombic system oxide synthesized in the above manner. Further, the use of a compound containing lithium such as lithium carbonate as a synthetic raw material allows an orthorhombic system oxide containing lithium in advance to be obtained.

<Powder X-Ray Diffraction Measurement>

The crystal state of the orthorhombic oxide in the active material can be observed using, for example, powder X-ray diffractometry (XRD).

A scattering angle 2θ is determined from the position of the diffraction peak obtained by the XRD measurement, and a crystal spacing d is calculated by the Bragg's law. The analysis allows the crystal structure (crystal system) to be identified. Further, known substances can be identified by referring to diffraction data of standard substances such as cards of the Joint Committee on Powder Diffraction Standards (JCPDS).

The powder X-ray diffraction measurement of the active material can be performed, for example, as follows:

First, a target sample is ground to an average particle diameter of about 5 µm. The average particle diameter thereof can be determined by the laser diffractometry. At this time, in order to check whether or not the grinding influences on the crystallizability of the sample, it is conformed whether or not a half-width value of the main peak in the X-ray chart is changed before and after the grinding.

Alternatively, particles having an average particle diameter of about 5 µm or less are selected using a sieve from the target sample.

A holder portion with a depth of 0.2 mm formed on a glass sample plate is filled with the sample ground or the sample subjected to the particle size selection. In this case, a care must be taken to fill the holder with the sample sufficiently. In order to prevent the occurrence of cracks and voids, a further care must be taken to apply the right amount of the sample.

Then, another glass plate is pressed against the sample and the surface of the sample with which the holder portion is filled is smoothed. In this case, a care must be taken to prevent the generation of parts which depress or protrude from the standard level of the holder due to an excess or a deficiency amount of the sample to be filled.

Then, the glass plate filled with the sample is placed in a powder X-ray diffractometer and a diffraction pattern is obtained using Cu-K$\alpha$ rays.

Incidentally, there is a case an orientation of the particles becomes high depending on the particle shape of the sample. When the orientation of the sample is high, the position of a peak may be shifted or the intensity ratio may be changed depending on the way of filling the sample. In such a case, the same sample is filled in a Lindemann glass capillary and the measurement is performed using a rotary sample stand, whereby the influence of the orientation can be determined. If there is a difference in the intensity ratio exceeding the device tolerance on a specific surface comparing the X-ray charts obtained, a measurement result obtained by using the rotary sample stand can be used as the measurement result of the sample.

When the powder X-ray diffraction measurement is performed on the active material contained in the electrode, it can be performed, for example, as follows:

First, in order to analyze the crystal state of the active material, the active material is put into a state in which lithium ions are perfectly released from the orthorhombic system oxide. For example, when the active material is used in the negative electrode, the battery is put into a fully discharged state. However, there is a case where lithium ions still remain even in a discharged state.

Next, the battery is disintegrated in a glove box filled with argon. Then, the electrode is taken out and washed with an appropriate solvent. As the appropriate solvent, for example, ethyl methyl carbonate may be used. If the electrode is washed insufficiently, it may sometimes be contaminated with an impurity phase of lithium carbonate or lithium fluoride due to the influence of the lithium ions remaining in the electrode. In such a case, it is better to use an airtight container in which the measurement can be performed in an inert gas atmosphere. The washed electrode is cut into a size having almost the same area of the holder of the powder X-ray diffractometer and used as a measurement sample. This sample is attached directly to the glass holder, followed by measurement of the sample. At this time, a peak corresponding to the metal of the metallic foil included in the electrode substrate is previously measured using XRD to obtain the peak position derived from the electrode substrate. Further, peak positions of other components such as a conductive auxiliary agent and a binder are previously measured in the same manner as above to obtain the positions. When the peak of the substrate material is overlapped on the peak of the active material, it is desired to separate the active material from the substrate prior to the measurement. This is performed in order to separate the overlapped peaks in the quantitative measurement of the peak intensity. Needless to say, the procedure can be omitted if these data have been obtained in advance. Although the electrode may be subjected to a physical separation, the separation can be easily performed by applying ultrasonic wave to the electrode in a solvent. When the ultrasonic treatment is performed in order to separate the active material from the substrate, the electrode powder (including the active material, the conductive auxiliary agent and the binder) can be recovered by volatilizing the solvent. The electrode powder recovered is filled in, for example, a Lindemann glass capillary and the measurement is performed, whereby the powder X-ray diffraction of the active material can be measured. The electrode powder recovered in the ultrasonic treatment may be subjected to various analyses other than the powder X-ray diffraction.

The active material according to the first embodiment as described above contains the orthorhombic system oxide represented by the formula: $Li_xM1M2_2O_6$ ($0 \leq x \leq 5$) (M1 is at least one selected from the group consisting of Fe and Mn, and M2 is at least one selected from the group consisting of Nb, Ta and V.). The electrode containing the active material containing the oxide can increase the absorption/release amount of lithium ions per mass. Accordingly, the nonaqueous electrolyte battery comprising the electrode containing the active material containing the oxide can realize high energy density. Further, the nonaqueous electrolyte battery comprising the electrode containing the active material containing the orthorhombic system oxide can absorb and release lithium at a potential nobler than the potential during electrocrystallization of metal lithium. The nonaqueous electrolyte battery can reduce or even eliminate the electrodeposition of metal lithium, resulting in rapid charge and discharge.

In other words, according to the first embodiment, there can be provided an active material which can realize a nonaqueous electrolyte battery having excellent rapid charge/discharge performance and high energy density.

Second Embodiment

According to the second embodiment, there is provided a nonaqueous electrolyte battery which comprises a negative electrode, a positive electrode, and a nonaqueous electrolyte. The active material in the first embodiment is used for the negative electrode active material, the positive electrode active material, or both of the negative electrode active material and the positive electrode active material.

The nonaqueous electrolyte battery according to the second embodiment may comprise a separator disposed between the positive electrode and the negative electrode and a container which houses the positive electrode, the negative electrode, the separator, and the nonaqueous electrolyte.

Hereinafter, the negative electrode, the positive electrode, the nonaqueous electrolyte, the separator, and the container will be described in detail.

1) Negative Electrode

The negative electrode comprises a current collector and a negative electrode layer (negative electrode active material containing layer). The negative electrode layer is formed on one side or both sides of the current collector. The layer comprises the active material and arbitrarily comprises the conductive agent and the binder.

The active material according to the first embodiment, i.e., the orthorhombic oxide represented by the formula: $Li_xM1M2_2O_6$ ($0 \leq x \leq 5$) is used for the negative electrode active material. Here, M1 is at least one selected from the group consisting of Fe and Mn, and M2 is at least one selected from the group consisting of Nb, Ta, and V.

According to a negative electrode using such a negative electrode active material, there can be provided a nonaqueous electrolyte battery having excellent rapid charge/discharge performance and high energy density.

As the negative electrode active material, the orthorhombic oxide represented by the formula: $Li_xM1M2_2O_6$ ($0 \leq x \leq 5$) may be used alone or as a mixture with other active materials. Examples of other active materials include niobium titanium composite oxide comprising monoclinic-system oxide ($Li_xNb_2TiO_7$, $Li_xNb_{10}Ti_2O_{29}$, $Li_xNb_{14}TiO_{37}$, $Li_xNb_{24}TiO_{62}$), titanium dioxide having an anatase structure or a monoclinic system β-type structure ($TiO_2$), lithium titanate having a ramsdellite structure (e.g., $Li_2Ti_3O_7$), and lithium titanate having a spinel structure (e.g., $Li_4Ti_5O_{12}$).

The conductive agent is added to improve the current collection performance and suppress the contact resistance with the current collector. Examples of the conductive agent include carbonaceous substances such as acetylene black, carbon black, and graphite.

The binder is added to fill gaps of the dispersed negative electrode active material and bind the active material to the current collector. Examples of the binder include polytetrafluoroethylene (PTFE), polyvinylidene fluoride (PVdF), fluorine-based rubber, and styrene butadiene rubber.

Preferably, blending rates of the active material, the conductive agent, and the binder in the negative electrode layer are 68 to 96 mass %, 2 to 30 mass %, and 2 to 30 mass %, respectively. If the amount of the conductive agent is set to 2 mass % or more, the current collection performance of the negative electrode layer can be improved. When the amount of the binder is set to 2% by mass or more, the binding property of the negative electrode layer and the current collector is sufficient and excellent cycle characteristics can be expected. On the other hand, the amounts of the conductive agent and the binder are preferably set to 28 mass % or less from the viewpoint of high capacity performance.

A material which is electrochemically stable at the lithium absorption and release potential of the negative electrode active material is used for the current collector. The current collector is preferably formed of copper, nickel, stainless steel or an aluminium, or an aluminium alloy containing at least one element selected from Mg, Ti, Zn, Mn, Fe, Cu, and Si. The thickness of the current collector is preferably from 5 to 20 μm. The current collector having such a thickness can achieve a good balance between the strength and lightweight of the negative electrode.

The negative electrode may be produced by a method comprising suspending the negative active material, the binder, and the conductive agent in a widely used solvent to prepare a slurry, applying the slurry to the negative electrode current collector, drying to form a negative electrode layer, and pressing it. The negative electrode may also be produced by forming a pellet comprising the active material, the binder, and the conductive agent to produce a negative electrode layer and placing the layer on the current collector.

2) Positive Electrode

The positive electrode comprises a current collector and a positive electrode layer (positive electrode active material containing layer). The positive electrode layer is formed on one side or both sides of the current collector. The layer comprises the active material and arbitrarily includes the conductive agent and the binder.

Usable examples of the active material include oxides or sulfides. Examples of the oxides and sulfides include manganese dioxide capable of absorbing lithium ($MnO_2$), iron oxide, copper oxide, nickel oxide, a lithium manganese composite oxide (e.g. $Li_xMn_2O_4$ or $Li_xMnO_2$), a lithium nickel composite oxide (e.g. $Li_xNiO_2$), a lithium cobalt composite oxide (e.g. $Li_xCoO_2$), a lithium nickel cobalt composite oxide (e.g. $LiNi_{1-y}Co_yO_2$), a lithium manganese cobalt composite oxide (e.g. $Li_xMn_yCo_{1-y}O_2$), a lithium-manganese-nickel composite oxide having a spinel structure (e.g. $Li_xMn_{2-y}Ni_yO_4$), a lithium phosphorus oxide having an olivine structure (e.g. $Li_xFePO_4$, $Li_xFe_{1-y}Mn_yPO_4$, $Li_xCoPO_4$), iron sulfate ($Fe_2(SO_4)_3$), a vanadium oxide (e.g. $V_2O_5$), and a lithium nickel cobalt manganese composite oxide. In the above formula, x is more than 0 and 1 or less and y is more than 0 and 1 or less. As the active material, these compounds may be used alone or in combination with a plurality of compounds.

Examples of a more preferred active material include a lithium manganese composite oxide having a high positive electrode voltage (e.g. $Li_xMn_2O_4$), a lithium nickel composite oxide (e.g. $Li_xNiO_2$), a lithium cobalt composite oxide (e.g. $Li_xCoO_2$), a lithium nickel cobalt composite oxide (e.g. $LiNi_{1-y}Co_yO_2$), a lithium-manganese-nickel composite oxide having a spinel structure (e.g. $Li_xMn_{2-y}Ni_yO_4$), a lithium manganese cobalt composite oxide (e.g. $Li_xMn_yCo_{1-y}O_2$), lithium iron phosphate (e.g. $Li_xFePO_4$), and a lithium nickel cobalt manganese composite oxide. In the above formula, x is more than 0 and 1 or less and y is more than 0 and 1 or less.

When the ordinary temperature molten salt is used as the nonaqueous electrolyte of the battery, examples of a preferred active material include lithium iron phosphate, $Li_xVPO_4F$ ($0 \leq x \leq 1$), a lithium manganese composite oxide, a lithium nickel composite oxide, and a lithium nickel cobalt composite oxide. Since these compounds have low reactivity with an ordinary temperature molten salt, the cycle life can be improved.

The primary particle diameter of the positive electrode active material is preferably 100 nm or more and 1 μm or less. In the case of the positive electrode active material having a primary particle diameter of 100 nm or more, the handling in the industrial production is easy. In the case of the positive electrode active material having a primary particle diameter of 1 μm or less, diffusion in solid of lithium ions can be smoothly proceeded.

The specific surface area of the active material is preferably 0.1 m²/g or more and 10 m²/g or less. In the case of the positive electrode active material having a specific surface area of 0.1 m²/g or more, the absorption and release site of lithium ions can be sufficiently ensured. In the case of the positive electrode active material having a specific surface area of 10 m²/g or less, the handling in the industrial production is made easy and good charge discharge cycle performance can be ensured.

The binder is added to bind the active material to the current collector. Examples of the binder include polytetrafluoroethylene (PTFE), polyvinylidene fluoride (PVdF), and fluorine-based rubber.

The conductive agent is added, if necessary, to improve the current collection performance and suppress the contact resistance between the active material and the current collector. Examples of the conductive agent include carbonaceous substances such as acetylene black, carbon black, and graphite.

In the positive electrode layer, the active material and binder are preferably formulated in a ratio of 80% by mass or more and 98% by mass or less and in a ratio of 2% by mass or more and 20% by mass or less respectively.

When the amount of the binder is 2% by mass or more, sufficient electrode strength is obtained. Further, when the amount of the binder is 20% by mass or less, the amount of the insulating material of the electrode can be reduced, leading to reduced internal resistance.

When the conductive agent is added, the active material, binder, and conductive agent are added in amounts of 77% by mass or more and 95% by mass or less, 2% by mass or more and 20% by mass or less and 3% by mass or more and 15% by mass or less respectively. When the amount of the conductive agent is 3% by mass or more, the above effect can be exerted. Further, when the amount of the conductive agent is 15% by weight or less, the decomposition of the nonaqueous electrolyte on the surface of the positive electrode conductive agent during storage at high temperatures can be reduced.

The collector is preferably an aluminum foil or an aluminum alloy foil containing at least one element selected from Mg, Ti, Zn, Ni, Cr, Mn, Fe, Cu, and Si.

The thickness of the aluminum foil or aluminum alloy foil is preferably 5 μm or more and 20 μm or less, more preferably 15 μm or less. The purity of the aluminum foil is preferably 99% by mass or more. The content of transition metals such as iron, copper, nickel, and chromium contained in the aluminum foil or aluminum alloy foil is set to, preferably 1% by mass or less.

The positive electrode may be produced by a method comprising suspending the active material, the binder, and the conductive agent to be added, if necessary in an appropriate solvent to prepare a slurry, applying the slurry to the positive electrode collector, drying to form a positive electrode layer, and pressing it. The positive electrode may also be produced by forming a pellet comprising the active material and binder and optionally the conductive agent to produce a positive electrode layer, which is then placed on the collector.

(Nonaqueous Electrolyte)

The nonaqueous electrolyte may be, for example, a liquid nonaqueous electrolyte prepared by dissolving an electrolyte in an organic solvent or a gel-like nonaqueous electrolyte prepared by forming a composite of a liquid electrolyte and a polymer material.

The liquid nonaqueous electrolyte is preferably one which is prepared by dissolving an electrolyte in an organic solvent at a concentration of 0.5 to 2.5 mol/L.

Examples of the electrolyte include lithium perchlorate ($LiClO_4$), lithium hexafluorophosphate ($LiPF_6$), lithium tetrafluoroborate ($LiBF_4$), arsenic lithium hexafluoride ($LiAsF_6$), lithium trifluoromethasulfonate ($LiCF_3SO_3$), a lithium salt such as lithium bis(trifluoromethylsulfonyl) imide [$LiN(CF_3SO_2)_2$], and the mixtures thereof. The electrolyte is preferably one which is not easily oxidized even at a high potential and $LiPF_6$ is the most preferable.

Examples of the organic solvent include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); and γ-butyrolactone (GBL), acetonitrile (AN), and sulfolane (SL). These organic solvents can be used alone or as a mixed solvent.

Examples of the polymer material include polyvinylidene fluoride (PVdF), polyacrylonitrile (PAN), and polyethylene oxide (PEO).

Alternatively, an ordinary temperature molten salt containing lithium ions (ionic melt), polymer solid electrolyte, inorganic solid electrolyte and the like may be used as the nonaqueous electrolyte.

The ordinary temperature molten salt (ionic melt) means compounds which can exist in a liquid state at normal temperature (15 to 25° C.) among organic salts constituted of combinations of organic cations and anions. Examples of the ordinary temperature molten salt include those which solely exist in a liquid state, those which are put into a liquid state when mixed with an electrolyte, and those which are put into a liquid state when dissolved in an organic solvent. The melting point of the ordinary temperature molten salt to be usually used for the nonaqueous electrolyte battery is 25° C. or less. Further, the organic cation has generally a quaternary ammonium skeleton.

The polymer solid electrolyte is prepared by dissolving an electrolyte in a polymer material and by solidifying the mixture.

The inorganic solid electrolyte is a solid material having lithium ion-conductivity.

4) Separator

The separator may be formed from a porous film including a material such as polyethylene, polypropylene, cellulose, or polyvinylidene fluoride (PVdF), or a synthetic resin nonwoven fabric. Particularly, a porous film formed of polyethylene or polypropylene can melt at a constant temperature and can block electric current, and thus it is preferred from the viewpoint of improvement in safety.

5) Container

As the container, a container formed of a laminate film having a thickness of 0.5 mm or less or a container formed of metal having a thickness of 1 mm or less can be used. The thickness of the laminate film is preferably 0.2 mm or less. The thickness of the metal container is more preferably 0.5 mm or less, still more preferably 0.2 mm or less.

The shape of the container may be flat-type (thin-type), square-type, cylindrical-type, coin-type, button-type or the like. The container may be, for example, a container for a small battery which is loaded into a portable electronic device or a container for a large battery which is loaded into a two- or four-wheeled vehicle depending on the size of the battery.

As the laminate film, a multilayer film in which a metal layer is intervened between resin layers is used. The metal layer is preferably aluminum foil or aluminum alloy foil in order to reduce the weight. Polymer materials such as polypropylene (PP), polyethylene (PE), nylon, and polyethylene terephthalate (PET) can be used for the resin layer. The laminate film can be formed into a shape of the container by heat sealing.

The metal container is formed from aluminium or an aluminium alloy. It is preferable that the aluminium alloy contains elements such as magnesium, zinc, and silicon. When transition metals such as iron, copper, nickel, and chromium are contained in the alloy, the content is preferably 1% by mass or less.

Subsequently, examples of the nonaqueous electrolyte battery according to the second embodiment will be more specifically described with reference to the drawings.

Figure 2:
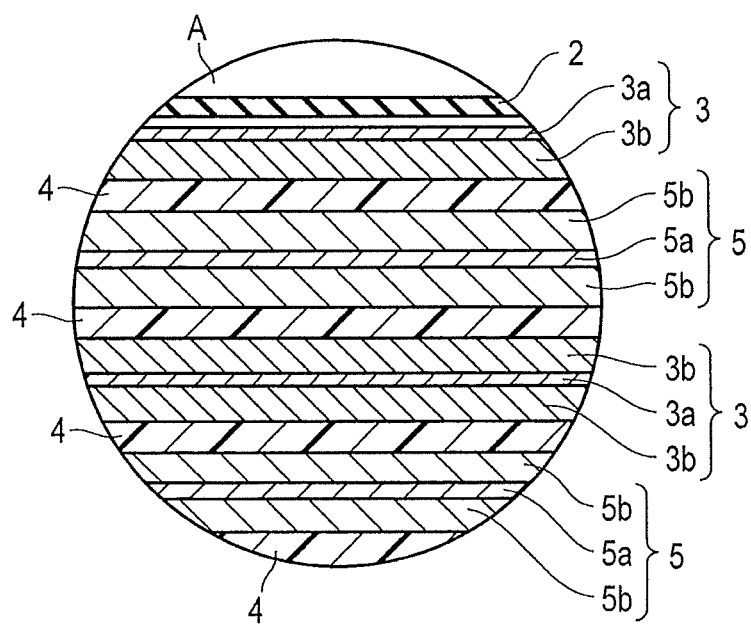
FIG. 2 is an enlarged sectional view of a A portion of FIG. 1.

FIG. 1 is a cross-sectional view of a flat-shaped nonaqueous electrolyte battery according to a second embodiment; FIG. 2 is an enlarged sectional view of a portion A of FIG. 1.

A battery 10 shown in FIGS. 1 and 2 comprises a flat-shaped wound electrode group 1. The flat-shaped wound electrode group 1 comprises a negative electrode 3, a separator 4, and a positive electrode 5. In the negative electrode 3, the separator 4, and the positive electrode 5, the separator 4 is intervened between the negative electrode 3 and the positive electrode 5. The flat-shaped wound electrode group 1 can be formed by stacking the negative electrode 3, the separator 4, and the positive electrode 5 so that the separator 4 is intervened between the negative electrode 3 and the positive electrode 5 to form a laminate, spirally winding the laminate so that the negative electrode 3 faces the outside as shown in FIG. 2, and subjecting it to press-molding.

Figure 4:
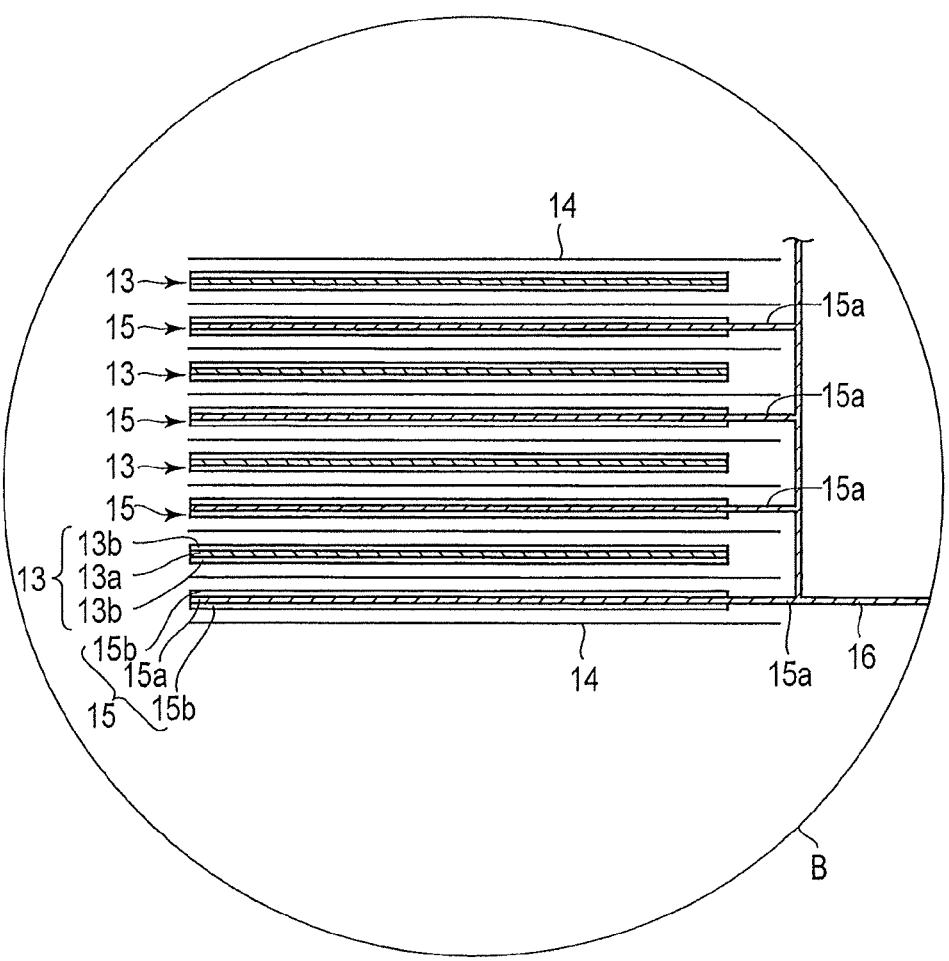
FIG. 4 is an enlarged sectional view of a B section of FIG. 3.

The negative electrode 3 comprises a negative electrode current collector 3a and a negative electrode layer 3b. The above-mentioned negative electrode active material is contained in the negative electrode layer 3b. As shown in FIG. 4, the negative electrode 3 on the outermost shell has a configuration in which the negative electrode layer 3b is formed at only one side of the inner plane of the negative electrode current collector 3a. In other negative electrodes 3, the negative electrode layer 3b is formed at both sides of the negative electrode current collector 3a.

In the positive electrode 5, the positive electrode layer 5b is formed at both sides of the positive electrode current collector 5a.

Figure 3:
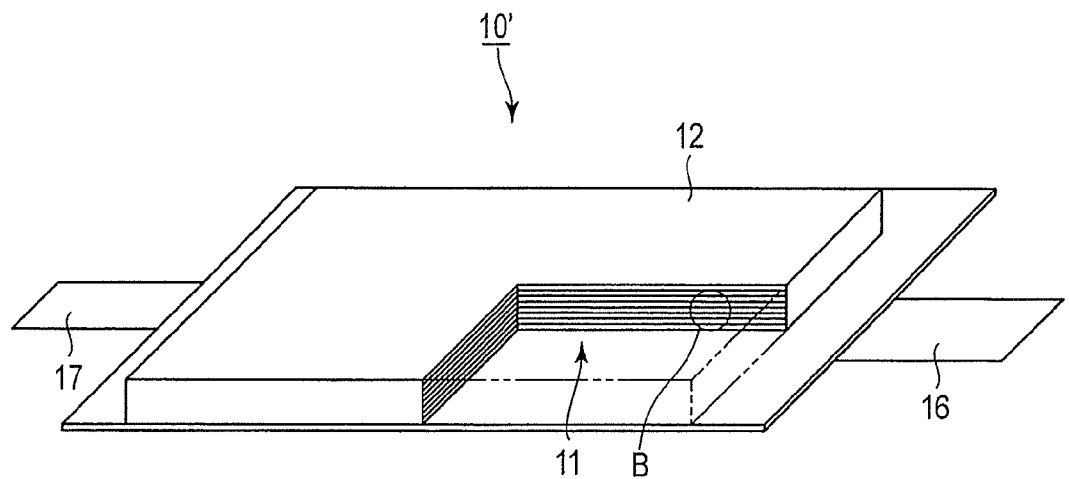
FIG. 3 is a partially cut perspective view schematically showing another flat-shaped nonaqueous electrolyte battery according to the second embodiment.

As shown in FIG. 3, in a vicinity of a peripheral edge of the wound electrode group 1, a negative electrode terminal 6 is connected to the negative electrode current collector 3a of the negative electrode 3 of the outermost shell, and a positive electrode terminal 7 is connected to the positive electrode current collector 5a of the positive electrode 5 at the inside. The negative electrode terminal 6 and the positive electrode terminal 7 are extended outwardly from an opening of the bag-shaped container 2. For example, the liquid nonaqueous electrolyte is injected from the opening of the bag-shaped container 2. The wound electrode group 1 and the liquid nonaqueous electrolyte can be completely sealed by heat-sealing the opening of the bag-shaped container 2 with the negative electrode terminal 6 and the positive electrode terminal 7.

The negative electrode terminal 6 is formed from a material which is electrically stable in Li absorption-release potential of the negative electrode active material and has conductivity. Specific examples thereof include copper, nickel, stainless steel, and aluminium. It is preferable that the negative electrode terminal 6 is formed of a material similar to that of the negative electrode current collector 3a in order to reduce the contact resistance with the negative electrode current collector 3a.

The positive electrode terminal 7 is formed of, for example, a material which is electrically stable in a potential range of 3 to 5 V to lithium ion metal and has conductivity. Specifically, it is formed of aluminium or an aluminium alloy containing elements such as Mg, Ti, Zn, Mn, Fe, Cu, and Si. It is preferable that the positive electrode terminal 7 is formed of the same material as that of the positive electrode current collector 3a in order to reduce the contact resistance with the positive electrode current collector 5a.

The nonaqueous electrolyte battery according to the second embodiment may have not only the configurations shown in FIGS. 1 and 2, but also the configurations shown in FIGS. 3 and 4.

FIG. 3 is a partially cut perspective view schematically showing another flat-shaped nonaqueous electrolyte secondary battery according to the second embodiment. FIG. 4 is an enlarged sectional view of a portion B of FIG. 3.

A battery 10' shown in FIGS. 3 and 4 comprises a lamination-type electrode group 11.

The lamination-type electrode group 11 is housed in a container 12 which is formed of a laminate film in which a metal layer is intervened between two resin films. As shown in FIG. 6, the lamination-type electrode group 11 has a structure in which a positive electrode 13 and a negative electrode 14 are alternately stacked while a separator 15 is intervened between the both electrodes. A plurality of the positive electrodes 13 are present and they comprise the current collector 13a and a positive electrode active material containing layer 13b formed at both sides of the current collector 13a. A plurality of the negative electrodes 14 are present and each of them comprises a negative electrode current collector 14a and a negative electrode active material containing layer 14b formed at both sides of the negative electrode current collector 14a. In each of the negative electrode current collectors 14a of the negative electrodes 14, a side is protruded from the negative electrode 14. The protruded negative electrode current collector 14a is electrically connected to a belt-like negative electrode terminal 16. The distal end of the negative electrode terminal 16 is externally drawn from the container 12. In the positive electrode current collector 13a of the positive electrode 13, not illustrated, one side located at the opposite side of the protruded side of the negative electrode current collector 14a is protruded from the positive electrode 13. The positive electrode current collector 13a protruded from the positive electrode 13 is electrically connected to a belt-like positive electrode terminal 17. The distal end of the belt-like positive electrode terminal 17 is located at the opposite side of the negative electrode terminal 16 and externally drawn from the container 12.

The nonaqueous electrolyte battery according to the second embodiment comprises a negative electrode containing the active material according to the first embodiment. Therefore, according to the second embodiment, there can be provided a nonaqueous electrolyte battery having excellent rapid charge/discharge performance and high energy density.

Third Embodiment

The battery pack according to the third embodiment comprises the nonaqueous electrolyte battery (unit cell) according to the second embodiment.

The battery pack according to the third embodiment may comprise one or a plurality of nonaqueous electrolyte batteries. When the battery pack according to the third embodiment comprises the nonaqueous electrolyte batteries, each of the unit cells may be electrically connected each other in series or in parallel.

Subsequently, on example of the battery pack according to the third embodiment will described with reference to the drawings.

Figure 5:
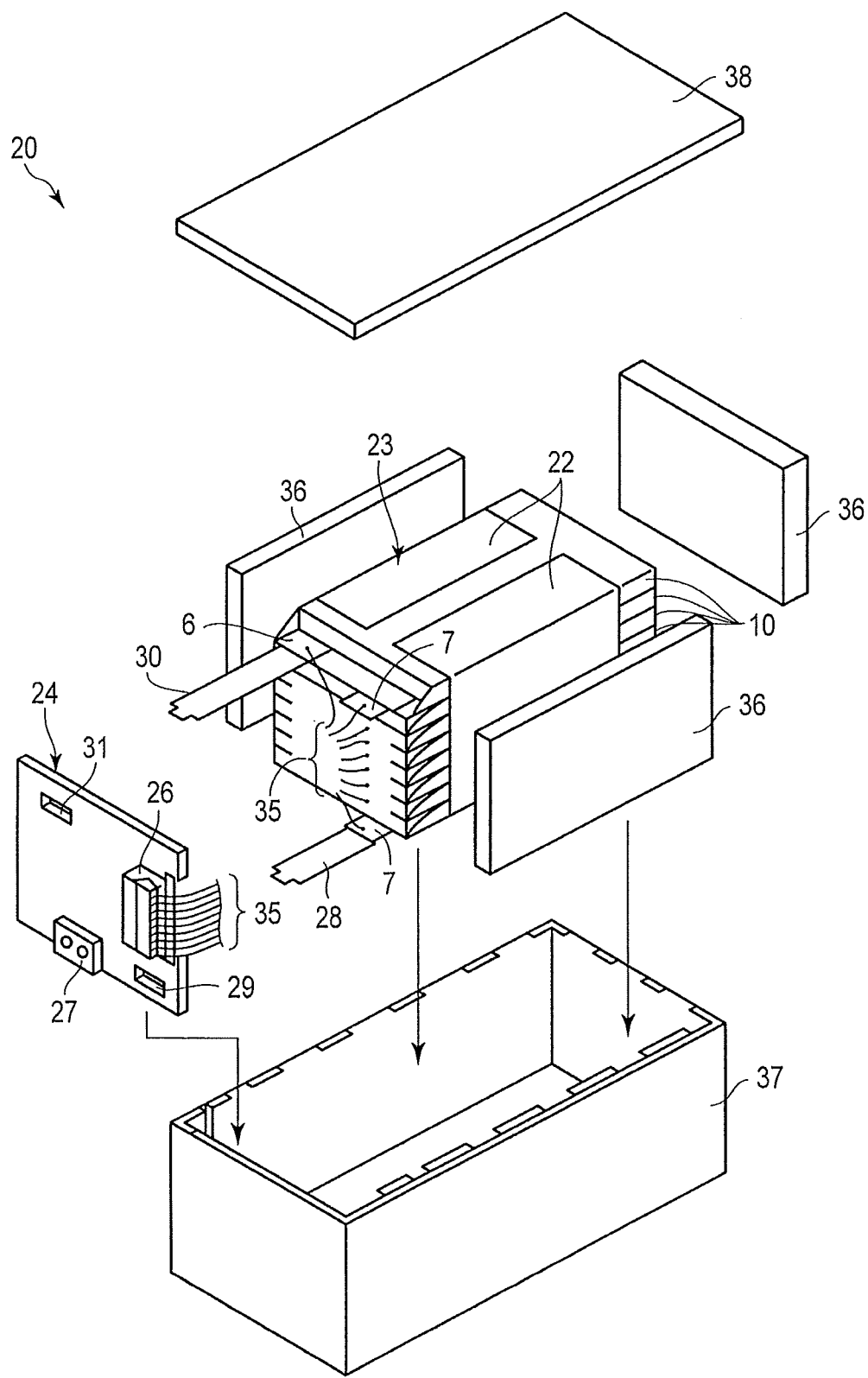
FIG. 5 is an exploded perspective view of a battery pack according to a third embodiment.

FIG. 5 is an exploded perspective view of a battery pack according to a third embodiment; FIG. 6 is a block diagram showing the electric circuit of the battery pack shown in FIG. 5.

A battery pack 20 shown in FIGS. 5 and 6 comprises a plurality of flat-type batteries 10 having the structures shown in FIGS. 1 and 2 as unit cells.

A battery module 23 is configured by stacking the unit cells 10 so that the negative electrode terminal 6 extended outside and the positive electrode terminal 7 are arranged in the same direction and fastening them with an adhesive tape 22. The unit cells 10 are electrically connected in series with one another as shown in FIG. 6.

A printed wiring board 24 is arranged opposed to the side plane where the negative electrode terminal 6 and the positive electrode terminal 7 in each of the unit cells 10 are extended. A thermistor 25, a protective circuit 26, and an energizing terminal 27 to an external instrument are mounted on the printed wiring board 24 as shown in FIG. 6. An electric insulating plate (not shown) is attached to the surface of the printed wiring board 24 facing the battery module 23 to avoid unnecessary connection of the wiring of the battery module 23.

A positive electrode-side lead 28 is connected to the positive electrode terminal 7 in each of the unit cells 10 located at the bottom layer of the battery module 23 and the distal end of the positive electrode-side lead 28 is inserted into a positive electrode-side connector 29 of the printed wiring board 24 so as to be electrically connected. A negative electrode-side lead 30 is connected to the negative electrode terminal 6 in each of the unit cells 10 located at the top layer of the battery module 23 and the distal end of the negative electrode-side lead 30 is inserted into an negative electrode-side connector 31 of the printed wiring board 24 so as to be electrically connected. The connectors 29 and 31 are connected to the protective circuit 26 through wirings 32 and 33 formed in the printed wiring board 24.

The thermistor 25 detects the temperature of the unit cells 10 and transmit a signal of the detected temperature to the protective circuit 26. The protective circuit 26 can shut down a plus-side wiring 34a and a minus-side wiring 34b between the protective circuit 26 and the energizing terminal 27 to an external instrument under a predetermined condition. An example of the predetermined condition indicates when a signal showing that the temperature of the unit cells 10 is a predetermined temperature or more is received from the thermistor 25. Further, the predetermined condition indicates when the over-charge, over-discharge, and over-current of the unit cells 10 are detected. The over-charge detection may be performed on each of the unit cells 10 or the whole of the unit cells 10. When each of the unit cells 10 is detected, the cell voltage may be detected, or positive electrode potential or negative electrode potential may be detected. In the case of the latter, a lithium electrode to be used as a reference electrode is inserted into each of the unit cells 10. In the battery packs of FIGS. 5 and 6, wirings 35 for voltage detection are connected to the unit cells 10 and a signal of the detected voltage are transmitted to the protective circuit 26 through the wirings 35.

Protective sheets 36 comprised of rubber or resin are arranged on three side surfaces of the battery module 23 except the side surface in which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction of the housing container 37 and on one of the internal surface at the opposite side in a short side direction. The printed wiring board 24 is arranged on the other internal surface in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, revolving a heat-shrinkable tube, and thermally shrinking the heat-shrinkable tube.

The battery pack 20 shown in FIG. 5 or FIG. 6 is configured to comprise the unit cells 10 which are connected to each other in series. In the battery pack according to the third embodiment, the unit cells 10 may be connected in parallel in order to increase the battery capacity. Alternatively, the battery pack according to the third embodiment may comprise a plurality of unit cells 10 which are connected in combination of series and parallel connections. The assembled battery pack 20 can be further connected in series or in parallel.

The battery pack 20 shown in FIG. 5 or FIG. 6 comprises a plurality of the unit cells 10, however the battery pack according to the third embodiment may comprise one unit cell 10.

The form of the battery pack is appropriately changed according to the use. The battery pack according to this embodiment is used suitably for the application which requires the excellent cycle characteristics when a high current is taken out. Specifically, it is used as the battery pack for power sources for digital cameras, the battery pack for vehicles such as two- or four-wheel hybrid electric vehicles, two- or four-wheel electric vehicles, and assisted bicycles or the like. Particularly, it is suitably used as a battery for automobile use.

The battery pack according to the third embodiment comprises the battery according to the second embodiment. As described above, the battery according to the second embodiment is a nonaqueous electrolyte battery which can have excellent rapid charge/discharge performance and high energy density. Therefore, according to the third embodiment described above, there can be provided a battery pack having excellent rapid charge/discharge performance and high energy density.

EXAMPLES

Hereinafter, the embodiments will be described in detail based on examples. The identification of the crystal phase and estimation of crystal structure of the synthesized orthorhombic system oxide were performed by powder X-ray diffractometry using Cu-Kα rays.

Example 1

(Synthesis)

As starting materials, commercially available oxide reagents FeO and $Nb_2O_5$ were used. Powders of these starting materials were weighed to have a molar ratio of 1:1 and mixed in a mortar. Then, the obtained mixture was put into an electric furnace and sintered in a nitrogen stream at 900° C. for a total of 10 hours. The sintered powder was subjected to a ball mill treatment using zirconia beads as media. As a result, a sample having an average particle diameter of 1.8 μm and a BET specific surface area of 12 $m^2/g$ was obtained.

(Powder X-Ray Diffraction Measurement)

The powder X-ray diffraction measurement was performed on the obtained sample as follows. First, a sample is ground until the average particle diameter becomes about 10 μm. A holder portion with a depth of 0.2 mm formed on a glass sample plate was filled with the ground sample. Then, using a separate glass plate, the glass plate was sufficiently pressed against the sample from the outside to smooth the surface of the sample. Then, the glass plate filled with the sample was placed in a powder X-ray diffractometer and a diffraction pattern was obtained using Cu-Kα rays. The JCPDS cards were used to confirm the obtained diffraction patterns. The obtained sample was identified as an orthorhombic system oxide $FeNb_2O_6$ of the JCPDS card 34-0426.

(Production of Negative Electrode)

Acetylene black as a conductive agent was added to the above synthesized orthorhombic complex oxide at 10 parts by weight based on the weight of the oxide. The mixture was dispersed in N-methyl-2-pyrrolidone (NMP) and a polyvinylidene fluoride (PVdF) as a binder was added to the mixture at 10 parts by weight based on the weight of the oxide. The slurry was applied to a current collector 3a made of an aluminum foil by using a blade. The slurry was dried at 130° C. for 12 hours in vacuo to obtain a negative electrode 3.

Example 2

An orthorhombic oxide $FeV_2O_6$ was prepared in the same manner as described in Example 1 except that commercially available oxide reagents FeO and $V_2O_5$ were used as starting materials. The average particle diameter of the obtained sample was 1.9 μm, and the BET specific surface area was 12 m$^2$/g. The sample was used to produce a negative electrode in the same manner as described in Example 1.

Example 3

An orthorhombic oxide $Fe_{0.5}Mn_{0.5}Nb_2O_6$ was prepared in the same manner as described in Example 1 except that commercially available oxide reagents FeO, $MnO_2$, and $Nb_2O_5$ were used as starting materials. The average particle diameter of the obtained sample was 1.6 μm, and the BET specific surface area was 14 m$^2$/g. The sample was used to produce a negative electrode in the same manner as described in Example 1.

Example 4

An orthorhombic oxide $MnNb_2O_6$ was prepared in the same manner as described in Example 1 except that commercially available oxide reagents $MnO_2$ and $Nb_2O_5$ were used as starting materials. The average particle diameter of the obtained sample was 2.0 μm, and the BET specific surface area was 12 m$^2$/g. The sample was used to produce a negative electrode in the same manner as described in Example 1.

Example 5

An orthorhombic oxide $MnTa_2O_6$ was prepared in the same manner as described in Example 1 except that commercially available oxide reagents $MnO_2$ and $Ta_2O_5$ were used as starting materials. The average particle diameter of the obtained sample was 2.4 μm, and the BET specific surface area was 10 m$^2$/g. The sample was used to produce a negative electrode in the same manner as described in Example 1.

Comparative Example 1

Commercially available $TiO_2$ and $Li_2CO_3$ were used as starting materials. Powders of these starting materials were weighed to have a molar ratio of 5:2 and mixed in a mortar. Then, the obtained mixture was put into an electric furnace and sintered in the air at 850° C. for a total of 24 hours. The sintered powder was subjected to a ball mill treatment using zirconia beads as media to obtain a cubic system oxide $Li_4Ti_5O_{12}$ having an average particle diameter of 1.1 μm and a BET specific surface area of 12 m$^2$/g. The sample was used to produce a negative electrode in the same manner as described in Example 1.

Comparative Example 2

A negative electrode was produced in the same manner as described in Example 1 except that a commercially available cubic system oxide $Fe_3O_4$ having an average particle diameter of 0.3 μm and a BET specific surface area of 10 m$^2$/g was used.

Comparative Example 3

A negative electrode was produced in the same manner as described in Example 1 except that a commercially available cubic system oxide FeO having an average particle diameter of 0.3 μm and a BET specific surface area of 10 m$^2$/g was used.

<Electrochemical Measurement>

An electrochemical measuring cell was produced using each negative electrode produced in Examples 1 to 5 and Comparative examples 1 to 3, a metal lithium foil as a counter electrode, and a nonaqueous electrolyte. As the nonaqueous electrolyte, a solution obtained by dissolving 1 M of lithium hexafluorophosphate in a mixed solvent of ethylene carbonate and diethyl carbonate (volume ratio: 1:1) was used.

The capacity at the first cycle of each measuring cell of Examples 1 to 5 and Comparative examples 1 to 3 was confirmed at a potential range of 0 V to 3.0 V (vs. Li/Li$^+$) relative to metal lithium electrode and at a charge/discharge current of 0.2 C (hourly discharge rate). Then, the rapid charge/discharge test was similarly carried out in an environment of 25° C. The rapid charge/discharge test was carried out at a potential range of 0.8 V to 3.0 V (vs. Li/Li$^+$) relative to metal lithium electrode and at a charge/discharge current of 2 C (hourly discharge rate). However, in order to confirm the capacity at the first cycle, the test using the measuring cell of Comparative Example 1 was carried out at a potential range of 0.8 V to 3.0 V (vs. Li/Li$^+$) to protect the crystal structure.

<Results>

The first cycle discharge (Li discharge) capacity and the capacity-maintenance ratio regarding the examples and the comparative examples are shown in Table 1. The capacity-maintenance ratio was a ratio (%) of the discharge capacity at the 30th cycle to the discharge capacity at the first cycle.

Figure 7:
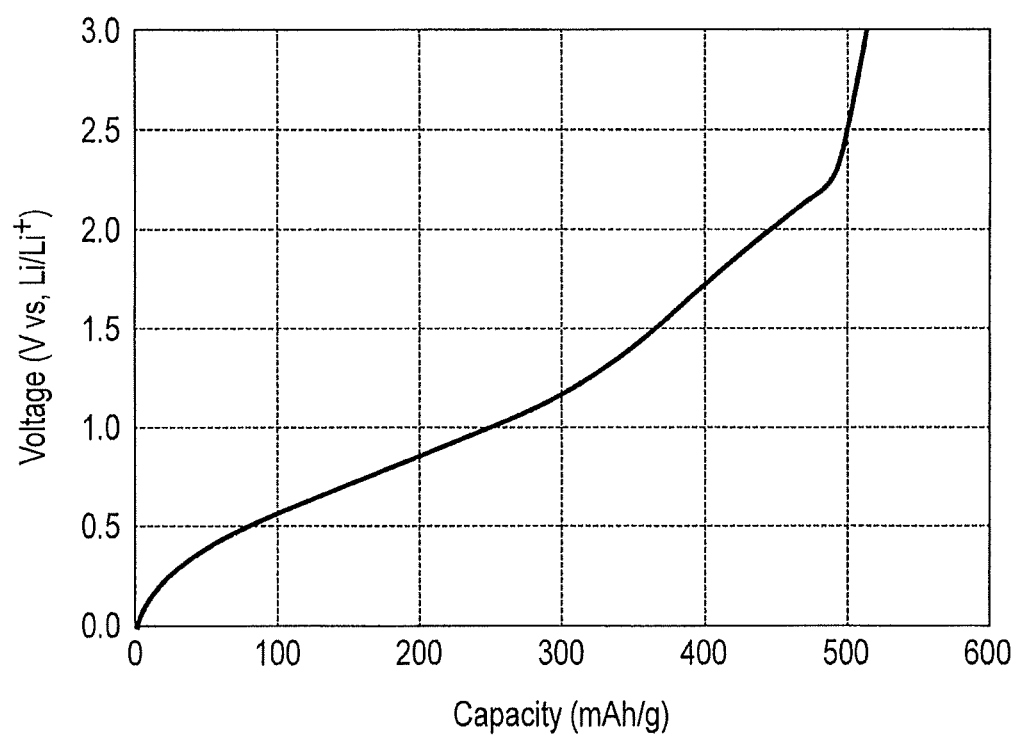
FIG. 7 is the first charge (Li insertion) curve of the electrode produced in Example 1.

The measured discharge (Li discharge) curve at the first cycle in the sample obtained in Example 1 is shown in FIG. 7.

TABLE 1

|  | General formula | Initial capacity (mAh/g) | Capacity retention (%) |
| --- | --- | --- | --- |
| Example 1 | $FeNb_2O_6$ | 510 | 88 |
| Example 2 | $FeV_2O_6$ | 600 | 80 |
| Example 3 | $Fe_{0.5}Mn_{0.5}Nb_2O_6$ | 500 | 87 |
| Example 4 | $MnNb_2O_6$ | 500 | 85 |
| Example 5 | $MnTa_2O_6$ | 440 | 80 |
| Comparative Example 1 | $Li_4Ti_5O_{12}$ | 160 | 100 |
| Comparative Example 2 | $Fe_3O_4$ | 460 | <10 |
| Comparative Example 3 | FeO | 520 | <10 |

From the results shown in FIG. 7, it is found that the capacity of an electrode using an orthorhombic system oxide of Example 1 as an active material is about 400 mAh/g when releasing lithium at a range of 2.5 V (vs. Li/Li$^+$) to 0.5 V (vs. Li/Li$^+$). The measured discharge (Li discharge) curve at the first cycle in each sample obtained in Examples 2 to 5 was the same as the curve of the sample of Example 1 shown in FIG. 7. In other words, the obtained results show that in nonaqueous electrolyte batteries of Examples 1 to 5 comprising a negative electrode containing an orthorhombic system oxide, a high capacity can be obtained by absorbing and releasing lithium at a potential nobler than the potential during electrocrystallization of metal lithium.

Further, from the results shown in Table 1, it is found that nonaqueous electrolyte batteries of Examples 1 to 5 comprising a negative electrode containing an orthorhombic system oxide did not exhibit a significantly decreased capacity, even if the rapid charge/discharge test was carried out at a charge/discharge current of 2 C (hourly discharge rate) 30 times. In other words, the obtained results show that in electrodes of the examples using an orthorhombic system oxide as an active material, it is possible to realize a nonaqueous electrolyte battery having a high capacity and excellent charge/discharge cycle performance even in rapid charging/discharging.

On the other hand, from the results shown in Table 1, it is found that the electrode of Comparative example 1 using a cubic system oxide has excellent rapid charge/discharge cycle performance, but has a low capacity.

From the results shown in Table 1, it is found that electrodes of Comparative examples 2 and 3 using a cubic system oxide have a high capacity. However, in electrodes of Comparative examples 2 and 3 using a cubic system oxide, the charge/discharge operation was repeated at a charge/discharge current of 2 C (hourly discharge rate) 30 cycles. As a result, the capacity was significantly reduced as shown in Table 1. In other words, the obtained results show that nonaqueous electrolyte batteries of Comparative examples 2 and 3 comprising an electrode using a cubic system oxide are poor in charge/discharge cycle performance during rapid charge and discharge, and thus they are not suitable for rapid charge and discharge.

Example 6-1

In Example 6-1, a negative electrode was produced in the same manner as described in Example 1 using a mixture obtained by mixing the orthorhombic system oxide FeNb$_2$O$_6$ obtained in Example 1 and a monoclinic system oxide Nb$_2$TiO$_7$ in a mixing ratio of 10:1.

The monoclinic system Nb$_2$TiO$_7$ was prepared by mixing Nb$_2$O$_5$ and TiO$_2$ as starting materials in a molar ratio of 1:1, and then sintering the mixture at 1200° C. for 12 hours.

Examples 6-2 and 6-3

A negative electrode was produced in the same manner as described in Example 6-1 except that the mixing ratio of the orthorhombic system oxide FeNb$_2$O$_6$ obtained in Example 1 to the monoclinic system Nb$_2$TiO$_7$ was 1:1 or 1:10.

Examples 7-1 to 7-3

Negative electrodes were produced respectively in the same manner as described in Examples 6-1 to 6-3 except that the spinel system Li$_4$Ti$_5$O$_{12}$ described in Comparative example 1 was used instead of the monoclinic system Nb$_2$TiO$_7$.

<Electrochemical Measurement>

Electrochemical measurement of each negative electrode produced in Examples 6-1 to 6-3 and Examples 7-1 to 7-3 was performed in the same manner as described in that of each negative electrode produced in Examples 1 to 5 and Comparative examples 1 to 3. The results are shown in Table 2.

TABLE 2

|  | Mixing ratio (w:w) | Initial capacity (mAh/g) | Capacity retention (%) |
|---|---|---|---|
| Example 6-1 | FeNb$_2$O$_6$:Nb$_2$TiO$_7$ = 10:1 | 483 | 90 |
| Example 6-2 | FeNb$_2$O$_6$:Nb$_2$TiO$_7$ = 1:1 | 375 | 93 |
| Example 6-3 | FeNb$_2$O$_6$:Nb$_2$TiO$_7$ = 1:10 | 267 | 98 |
| Example 7-1 | FeNb$_2$O$_6$:Li$_4$Ti$_5$O$_{12}$ = 10:1 | 475 | 90 |
| Example 7-2 | FeNb$_2$O$_6$:Li$_4$Ti$_5$O$_{12}$ = 1:1 | 263 | 94 |
| Example 7-3 | FeNb$_2$O$_6$:Li$_4$Ti$_5$O$_{12}$ = 1:10 | 195 | 99 |

From the results shown in Table 2, it is found that the electrodes in Examples 6-1 to 6-3 and Examples 7-1 to 7-3, in which the active material different from the orthorhombic system oxide FeNb$_2$O$_6$ obtained in Example 1 is combined, show better cycle performance than that in Example 1. It is further found that the electrodes in Examples 6-1 to 6-3 and Examples 7-1 to 7-3 show the initial capacity higher than that in Comparative example 1.

The cell for electrochemical measurement produced in each of Examples and Comparative examples described above has the lithium metal as a counter electrode, and the potential of the negative electrode produced in each of Examples and Comparative examples is nobler than the counter electrode. As a result, the negative electrode produced in each Examples and Comparative examples acts as a positive electrode in the cell for the electrochemical measurement described above. Here, in order to avoid confusions, in Examples described above, a direction of inserting lithium ions into the negative electrode produced in each of Examples and Comparative examples is uniformly referred to as "charging" and a direction of releasing the ions from the negative electrode is uniformly referred to as "discharging."

On the other hand, the negative electrode produced in each of Examples and Comparative examples can act as the negative electrode in a battery produced combining with a conventionally known positive electrode material. In the battery produced in this way, a direction of inserting lithium ions into the negative electrode produced in each Examples and Comparative examples is a discharging direction, and a direction of releasing the ions from the negative electrode is a charging direction.

Hence, according to at least one of the embodiments and the examples as described above, there can be provided an active material which can realize a nonaqueous electrolyte battery having excellent rapid charge/discharge performance and high energy density.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery, comprising:
a negative electrode comprising a negative electrode active material;
a positive electrode; and
a nonaqueous electrolyte,
wherein the negative electrode active material comprises:
a niobium titanium composite oxide comprising monoclinic-system oxide, and
an orthorhombic system oxide represented by the following formula:

$Li_xM1M2_2O_6$ wherein 0≤x≤5, M1 is at least one selected from the group consisting of Fe and Mn, and M2 is at least one selected from the group consisting of Nb, Ta and V.

2. The nonaqueous electrolyte battery according to claim 1, wherein the niobium titanium composite oxide is selected from the group consisting of $Li_xNb_2TiO_7$, $Li_xNb_{10}Ti_2O_{29}$, $Li_xNb_{14}TiO_{37}$, and $Li_xNb_{24}TiO_{62}$.

3. A battery pack comprising the nonaqueous electrolyte battery according to claim 1.

4. The battery pack according to claim 3, comprising a plurality of the nonaqueous electrolyte batteries.

5. The battery pack according to claim 4, wherein the plurality of the nonaqueous electrolyte batteries are electrically connected to each other in series, in parallel or in the combination thereof.

6. The battery pack according to claim 3, further comprising:
a protective circuit configured to detect a voltage of the nonaqueous electrolyte battery.

7. The nonaqueous electrolyte battery according to claim 1, wherein the orthorhombic system oxide is represented by the formula $Li_xFeNb_2O_6$, where 0≤x≤5, or the formula $Li_xFeV_2O_6$, where 0≤x≤5.

8. The nonaqueous electrolyte battery according to claim 1, wherein the orthorhombic system oxide has a BET specific surface area of 1 m$^2$/g or more and 50 m$^2$/g or less.

9. The nonaqueous electrolyte battery according to claim 1, wherein the positive electrode comprises a positive electrode active material, and
the positive electrode active material comprises at least one selected from the group consisting of a manganese dioxide, an iron oxide, a copper oxide, a nickel oxide, a lithium manganese composite oxide, a lithium nickel composite oxide, a lithium cobalt composite oxide, a lithium nickel cobalt composite oxide, a lithium manganese cobalt composite oxide, a lithium-manganese-nickel composite oxide having a spinel structure, a lithium phosphorus oxide having an olivine structure, an iron sulfate, a vanadium oxide, and a lithium nickel cobalt manganese composite oxide.

10. The nonaqueous electrolyte battery according to claim 9, wherein a primary particle diameter of the positive electrode active material is 100 nm or more and 1 μm or less.

11. The nonaqueous electrolyte battery according to claim 9, wherein a specific surface area of the positive electrode active material is 0.1 m$^2$/g or more and 10 m$^2$/g or less.

* * * * *